(12) United States Patent
Bachelder et al.

(10) Patent No.: US 11,875,219 B2
(45) Date of Patent: *Jan. 16, 2024

(54) SYSTEM AND METHOD FOR AUTO-FOCUSING A VISION SYSTEM CAMERA ON BARCODES

(71) Applicant: Cognex Corporation, Natick, MA (US)

(72) Inventors: Ivan A. Bachelder, Hillsbobough, NC (US); Chen Gao, Wayland, MA (US); Francisco Azcona Guerrero, Aachen (DE); Jose Fernandez Dorado, Vaals (NL); Esther Oteo Lozano, Aachen (DE); Andreas Weber, Aachen (DE)

(73) Assignee: Cognex Corporation, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,832

(22) Filed: Jan. 3, 2022

(65) Prior Publication Data

US 2022/0318539 A1 Oct. 6, 2022

Related U.S. Application Data

(63) Continuation of application No. 16/896,164, filed on Jun. 8, 2020, now Pat. No. 11,216,630, which is a (Continued)

(51) Int. Cl.
*G06K 7/14* (2006.01)
*G06K 7/10* (2006.01)
(Continued)

(52) U.S. Cl.
CPC ....... *G06K 7/1443* (2013.01); *G06K 7/10722* (2013.01); *G06K 7/1413* (2013.01); *H04N 23/959* (2023.01); *H04N 23/671* (2023.01)

(58) Field of Classification Search
CPC ............... G06K 7/1443; G06K 7/1413; G06K 7/10722; H04N 5/232125
(Continued)

(56) References Cited

U.S. PATENT DOCUMENTS 9,317,730 B1 * 4/2016 Stokes ................. G06K 7/1417
2004/0190762 A1 * 9/2004 Dowski, Jr. ............ G02B 5/284
382/128

(Continued)

FOREIGN PATENT DOCUMENTS

JP     200840584    2/2008
JP     2009244430   10/2009
(Continued)

*Primary Examiner* — Edwyn Labaze
(74) *Attorney, Agent, or Firm* — Loginov & Associates, PLLC; William A. Loginov

(57) ABSTRACT

This invention provides a system and method for detecting and acquiring one or more in-focus images of one or more barcodes within the field of view of an imaging device. A measurement process measures depth-of-field of barcode detection. A plurality of nominal coarse focus settings of a variable lens allow sampling, in steps, of a lens adjustment range corresponding to allowable distances between the one or more barcodes and the image sensor, so that a step size of the sampling is less than a fraction of the depth-of-field of barcode detection. An acquisition process acquires a nominal coarse focus image for each nominal coarse focus setting. A barcode detection process detects one or more barcode-like regions and respective likelihoods. A fine focus process fine-adjusts, for each high-likelihood barcode, the variable lens near a location of the barcode-like regions. The process acquires an image for decoding using the fine adjusted setting.

20 Claims, 5 Drawing Sheets

Related U.S. Application Data continuation of application No. 16/043,716, filed on Jul. 24, 2018, now Pat. No. 10,679,024.

(51) Int. Cl.
*H04N 23/959* (2023.01)
*H04N 23/67* (2023.01)

(58) Field of Classification Search
USPC ............ 348/348; 235/462.01, 462.2, 462.22, 235/462.23, 454, 375; 385/140
See application file for complete search history.

(56) References Cited

U.S. PATENT DOCUMENTS

| | | | |
|---|---|---|---|
| 2005/0218231 A1* | 10/2005 | Massieu | G02B 3/14 235/462.23 |
| 2009/0095815 A1* | 4/2009 | He | G06K 7/10811 235/462.41 |
| 2011/0019065 A1 | 1/2011 | Chanas | |
| 2014/0239073 A1 | 8/2014 | Toyoda | |
| 2016/0012268 A1* | 1/2016 | Wang | G02F 1/29 235/462.01 |

FOREIGN PATENT DOCUMENTS

| | | |
|---|---|---|
| JP | 2010523043 | 7/2010 |
| JP | 2011123694 | 6/2011 |
| JP | 2013214986 | 10/2013 |
| JP | 2014164721 | 9/2014 |
| WO | 2008118085 | 10/2008 |

\* cited by examiner

SYSTEM AND METHOD FOR AUTO-FOCUSING A VISION SYSTEM CAMERA ON BARCODES

RELATED APPLICATION

This application is a continuation of co-pending U.S. patent application Ser. No. 16/896,164, entitled SYSTEM AND METHOD FOR AUTO-FOCUSING A VISION SYSTEM CAMERA ON BARCODES, filed Jun. 8, 2020, which is a continuation of U.S. patent application Ser. No. 16/043,716, entitled SYSTEM AND METHOD FOR AUTO-FOCUSING A VISION SYSTEM CAMERA ON BARCODES, filed Jul. 24, 2018, now U.S. Pat. No. 10,679,024, issued Jun. 9, 2020, the teachings of each of which applications are incorporated herein by reference.

FIELD OF THE INVENTION

This invention relates to machine vision systems for finding and decoding 1D and 2D barcodes and other forms of symbology or ID codes, and more particularly to camera focusing systems for use in reading barcodes and/or other ID codes.

BACKGROUND OF THE INVENTION

Vision systems that perform measurement, inspection, and/or alignment of objects and/or decoding of symbology in the form of machine-readable symbols (also termed "barcodes", "ID codes", "codes" and/or simply, "IDs"). Often, these machine-readable symbols take the form of well-known 1-dimensional (1D) and two-dimensional (2D) barcodes, such as a 2D DataMatrix codes, QR codes, DPM codes, etc. More generally, a barcode can be defined as an optical, machine-readable, representation of data; the data often describing something about the object that carries the barcode. Traditional barcodes systematically represent data by varying the widths and spacings of parallel lines, and may be referred to as linear or one-dimensional (1D). Later, two-dimensional (2D) variants were developed, using rectangles, dots, hexagons and other geometric patterns, called matrix codes or 2D barcodes, although they do not use bars as such, including, but not limited to DataMatrix codes, QR codes, and DPM codes, which are all used in a wide range of applications and industries. Barcode-reading systems are based generally around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of a barcode reader (also termed herein, a "camera"), the user or automated process acquires an image of an object that is believed to contain one or more barcodes. The image is processed to identify barcode features, which are then decoded by a decoding process and/or processor obtain the inherent alphanumeric data represented by the code.

In operation, a barcode reader typically functions to illuminate the scene containing one or more barcodes. This illumination can include aimers that project a colored dot on the region of interest in the imaged scene, whereby the user can center the image axis of the reader on the barcode within the imaged scene. This illuminated scene is then acquired by an image sensor within the camera assembly through optics. The array sensor pixels is exposed, and the electronic value(s) generated for each pixel by the exposure is/are stored in an array of memory cells that can be termed the "image" of the scene. In the context of a barcode-reading application, the scene includes an object of interest that has one or more barcodes of appropriate dimensions and type. The barcode(s) are part of the stored image.

A common use for barcode readers is to track and sort objects moving along a line (e.g. a conveyor) in manufacturing and logistics operations. The barcode reader, or more typically, a plurality (constellation) of readers, can be positioned over the line at an appropriate viewing angle(s) to acquire any expected barcodes on the face(s) of respective objects as they each move through the field of view. The focal distance of the reader with respect to the object can vary, depending on the placement of the reader with respect to the line and the size of the object. As such, the use of an auto-focus mechanism in association with the barcode reader is desirable to attain the proper focal distance.

Existing techniques for providing auto-focus functionality to barcode readers entail sweeping through a potentially large number of focus settings, and choosing the setting which maximizes image sharpness for a selected region of interest. A procedure for auto-focus is described, by way of useful background information in Daniel Vaquero, Natasha Gelfand, Marius Ticol, Kari Pulli 1 and Matthew Turk, *Generalized Autofocus*, Applications of Computer Vision (WACV), 2011 IEEE.

The region of interest is often selected using heuristic contrast measurements, which often mistake other high-contrast structures (e.g. text or other graphics) for barcodes. Both the contrast measurements and the sharpness metrics are only meaningful when the focus is nearly correct, which is why a large number of focus settings need to be considered during the sweep. Moreover, the sharpness metrics are sensitive to lighting, which is something that might also vary (e.g. during the course of an auto-regulation operation, where the lighting is also being optimized). Such methods are, therefore, time-consuming, and can result in focusing on the wrong area of the scene. Additionally, commercially available techniques for locating barcodes have operated too slowly to employ directly during an auto-focusing process loop. In general, focus on a region is first established, and then the barcode finding and decoding procedures operate upon a focused image of the region of interest.

SUMMARY OF THE INVENTION

This invention overcomes disadvantages of the prior art by providing a system and method for detecting and acquiring one or more in-focus images of one or more barcodes within the field of view of the imaging device that acquires one or more images of a scene containing the barcodes. A variable lens receives focus adjustment information from a focus process and directs received light to an image sensor. A measurement process measures an effective depth-of-field of barcode detection as the maximum focus error for which the one or more barcodes can be reliably detected by the focus process. This depth-of-field measurement process can be predicated in whole, or in part, upon automated systems, or upon manual inputs from (e.g.) a system user, which can be estimates (e.g.) based on heuristics, observations or other calculations. A plurality of nominal coarse focus settings of the variable lens allow sampling in sampling steps of a lens adjustment range corresponding to the range of allowable distances between the one or more barcodes and the image sensor, so that a step size of the sampling steps is less than a fraction of the depth-of-field of barcode detection. An acquisition process acquires, with the image sensor, acquires a nominal coarse focus image for at least one coarse focus setting of the variable lens. A barcode detection process detects one or more barcode-like regions (which can be a portion of an overall barcode pattern) within each nominal coarse focus image. A fine focus process fine-adjusts, for each barcode-like regions with a sufficiently high likelihood the coarse focus image, in order of highest to lowest likelihood, the variable lens from the coarse setting to optimize the focus of the image near a location of the barcode-like region. The fine focus process then acquires an image for decoding using an optimized, fine adjusted focus setting of the variable lens.

In an illustrative embodiment, a system and method is provided for detecting and acquiring one or more in-focus images of one or more barcodes within the field of view of an imaging device having an image sensor that acquires one or more images of a scene containing the one or more barcodes. The system and method includes a variable lens that receives focus adjustment information from a focus process and directs received light to the image sensor. A measurement process measures an effective depth-of-field of barcode detection as the maximum focus error for which the one or more barcodes can be reliably detected by the focus process. A plurality of nominal coarse focus settings of the variable lens allows sampling in sampling steps of a lens adjustment range corresponding to the range of allowable distances between the one or more barcodes and the image sensor. The step size of the sampling steps is typically less than a fraction of the depth-of-field of barcode detection. An acquisition process acquired, with the image sensor, a nominal coarse focus image for at least one coarse focus setting of the variable lens. A barcode detection process detects one or more barcode-like regions and their respective likelihoods within each nominal coarse focus image. A fine focus process fine-adjusts, for each barcode-like regions with a sufficiently high likelihood the coarse focus image, the variable lens from the coarse setting to optimize the focus of the image near a location of the barcode-like region. The fine focus process acquires an image for decoding using an optimized, fine adjusted focus setting of the variable lens. Illustratively, the barcode detection process is arranged to measure a respective likelihood of the barcode-like regions, and wherein the at least one of the barcode-like regions defines a likelihood above a predetermined level. The barcode detection process can operate at a substantially maximum frame rate of reliably locating the barcode-like regions within an image acquired by the image sensor. The depth-of-field can be measured in diopters and the adjustment information defines diopters. In embodiments, the fraction can comprise a value no greater than approximately one half the depth-of-field of barcode detection. The variable lens can comprise a high-speed liquid lens. Illustratively, the fine focus process can be arranged to optimize the focus of the image by acquiring an image at one or more adjusted focus settings, and the one or more adjusted focus settings can be arranged to maximize an image sharpness score in a local region around a respective of the barcode-like regions. A processing unit can be provided, operatively connected to the variable lens and the image sensor, and the processing unit can operate at least one of the focus process, barcode detection process and acquisition process. Illustratively, the processing unit can comprise at least one of a GPU and an FPGA. The variable lens can be adjusted based upon an iterative and/or numerical-step-based search technique over the coarse focus settings. The fine focus process fine-adjusts the variable lens from the coarse setting in order of a highest to a lowest of the likelihoods. The barcode can comprises at least one of a 1D barcode and a 2D barcode. The coarse focus setting can be based upon a distance measurement generated by a distance sensor relative to the imaging device. That distance sensor can comprise at least one of a time-of-flight-sensor, a LIDAR, a radar, an ultrasonic sensor, a stereoscopic sensor, and a sonar sensor.

In an illustrative embodiment, a system and method for focusing an imaging system on one or more barcodes is provided. Nominal coarse focus images are acquired for each of at least two nominal coarse focus settings. The nominal coarse focus settings are selected so as to sample the range of allowable distances between respective of the barcodes and the imaging system. A barcode detector determines barcode-like regions within each the nominal coarse focus images and estimates a respective likelihood that each of the barcode-like regions are actual barcodes. The barcode detector operates within an effective depth-of-field that allows a barcode at a range of distances between the sampled distances corresponding to the nominal coarse focus settings to be detected reliably in the presence of focus blur. For each barcode-like regions with a sufficiently high likelihood, in order of highest to lowest likelihood, a fine focus procedure optimizes the focus, and acquires an image that is sharp enough to successfully decode the one or more barcodes at respective of the barcode-like regions. The fine focus procedure optimizes the focus by maximizing a sharpness measurement in a local region around the barcode-like region by acquiring images at one or more adjusted focus settings that are substantially near the nominal coarse focus setting used to acquire the nominal coarse focus image in which the barcode-like region is detected by the barcode detector. Illustratively, a vision system processor receives the acquired nominal coarse focus images and operates the barcode detector. The vision system processor can comprise at least one of a GPU and an FPGA. An electronically controlled variable focus lens assembly can be used to image the nominal coarse focus images at selected focal lengths. The lens can further comprise a high speed liquid lens in which the focal length thereof can be set based upon a diopter value. Illustratively, the operation of the system and method can be performed according to a plurality of priority levels.

BRIEF DESCRIPTION OF THE DRAWINGS

The invention description below refers to the accompanying drawings, of which.

DETAILED DESCRIPTION

I. System Overview

Figure 1:
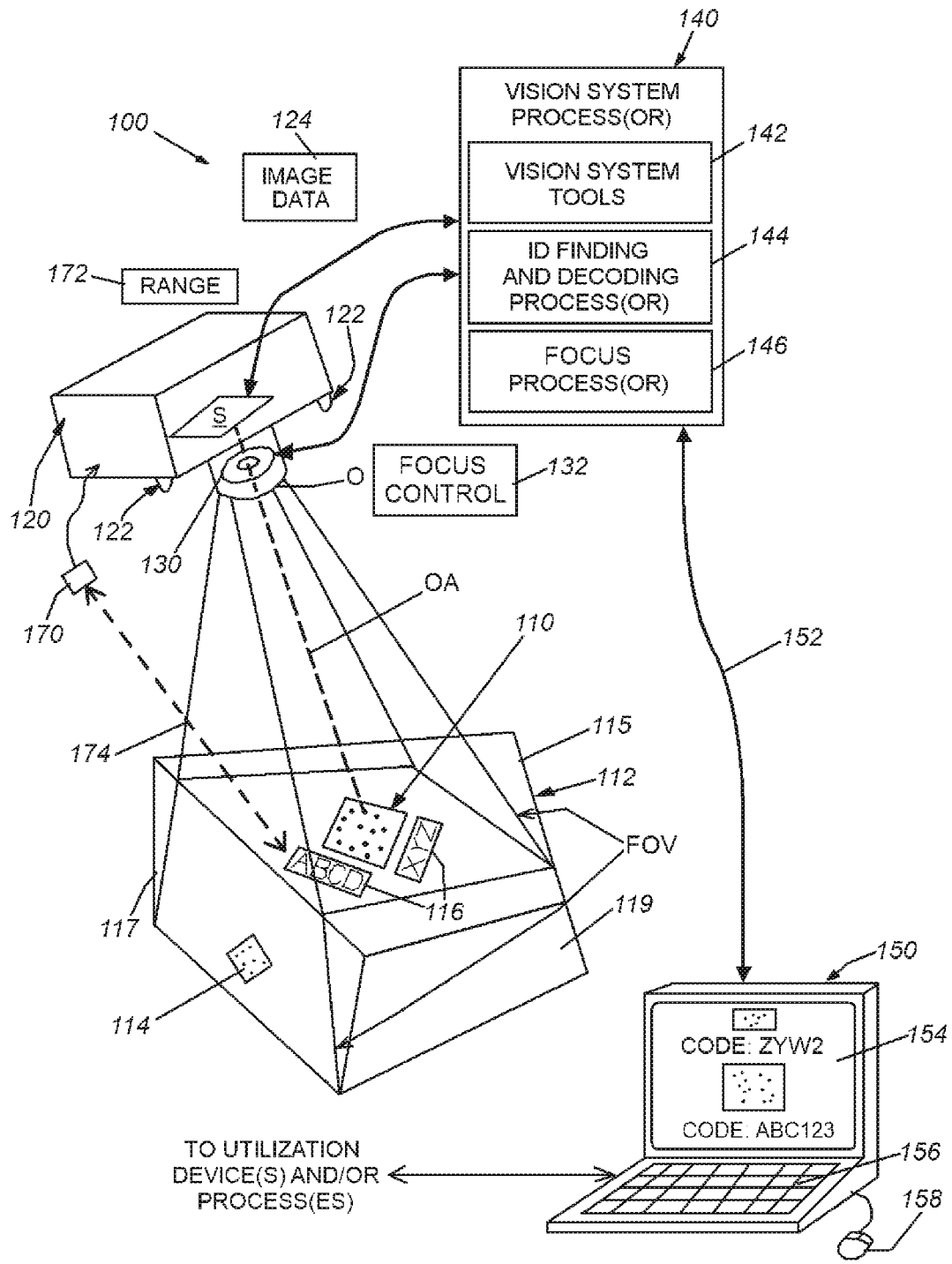
FIG. 1 is a diagram of a vision system arrangement in which a fixed or handheld vision system camera is shown imaging an object containing a barcode, employing an auto-focus system and method according to an embodiment.

FIG. 1 shows an arrangement 100 for reading and decoding one or more barcodes (one-dimensional and two-dimensional (1D and 2D) barcodes, such as DPM and QR codes, and other related symbology codes) 110 and 114 located on an exemplary object and/or other imaged scene 112 according to an embodiment. The exemplary object 112 is shown herein with multiple faces 115, 117 and 119 that define a three-dimensional structure. The arrangement 100 includes a vision system camera assembly 120, which can be a handheld unit or a fixed unit. A plurality of cameras can be employed to image the scene in alternate embodiments, each operating the system and method herein. As described further below, the system and method herein can effectively differentiate between barcode-like features 110 and 114 relative to other geometric and textual information adjacent thereto, such as text 116. Thus, the system and method herein effectively enables one or more barcodes within the field of view (FOV) to be rapidly found and decoded, despite the presence of other potentially confounding features, which are, likewise discarded as barcode-like regions (and/or barcode candidates) quickly by the process. As used herein, the term "barcode-like region" refers to all or portion of an image that contains features representing all or part of a barcode of any appropriate type/format. Hence, the barcode-like region can be identified based upon a discernable portion and/or fragment of the overall barcode occurring therein. Note that barcode 114 is located on upright face 117 so that it presents a different distance with respect to the image sensor relative to barcode 110 on the object face 115. The system and method herein can also effectively find multiple barcodes at differing distances in the same overall field of view (FOV) using the auto-focus techniques described herein.

The camera assembly can include a variety of functional elements, including built-in and/or separate illumination/aimers 122, an image sensor S (that can be implemented using CMOS, or another appropriate technology, and an optics module O. The sensor S can define any acceptable format and pixel array size, and can be implemented to deliver image data 124 in either color or grayscale form.

The optics O can be any acceptable package that is either integral or removable (for example a threaded lens base assembly). The optics O includes a variable-focus lens unit 130 that physically changes the focal distance of the optics to accommodate the working distance, along the optical axis OA, between the image plane of the sensor S and the surface containing the barcode 110. The variable-focus lens 130 can be based on a variety of operating principles—such as a mechanical, motorized lens that moves along the optical axis to vary focus or a so-called liquid lens that changes the shape of the lens profile based upon movement of a ferrofluid in the presence of an electromagnetic field. Liquid lenses are available commercially from a variety of vendor, such as Varioptic SA of France or Optotune AG of Switzerland. The variable-focus lens 130 is controlled via signals 132 that are generated in accordance with the lens manufacturer's specification. Typically, such signals 132 are delivered as a variable current and/or voltage level, based (typically) upon a digital value generated by the vision system process(or) 140 (or another process(or)), described further below. The variable focus function can operate to size the field of view (FOV) fully image the barcode, while maintaining sufficient resolution for the process(or) 140 to decode barcode features.

The vision system process(or) 140 can be partially or fully contained within the housing of the camera assembly or any attached devices (for example an attached smartphone). Alternatively, or additionally, the processor can be partially or fully instantiated within a separate standalone computing device 150, such as a server, PC, laptop, tablet or smartphone, interconnected via an appropriate wired and/or wireless data link 152 with the camera assembly 120. Such computing device 150 can also be removably attached to an on-board processor within the camera assembly when needed to monitor, adjust or set up the vision system. The computing device 150 can include appropriate user interface components, such as a display/touchscreen 154, keyboard 156 and/or mouse 158. The process(or) 140, computing device 150 and/or another device within the arrangement 100 can be linked to one or more downstream utilization devices and/or processes that employ decoded data derived from the barcodes to perform tasks, such as part-recognition, logistics, object sorting, etc.

In embodiments, the processor 140 can comprise or include a graphical processing unit (GPU) of a field programmable gate array (FPGA) that carries out the desired program instructions used herein.

The vision system process(or) 140 include a plurality of functional processes(ors) for carrying out the operations of the vision system arrangement 100. The vision system process(or) 140 can include a vision system tool module 142, which can comprise one or more tools that are employed in finding and analyzing image features—such as edge founders, blob analyzers, calipers, alignment and pattern recognition processes(ors), etc. The vision system process(or) 140 also includes a barcode finding and decoding process(or) 144, which can be based upon a commercially available or customized (e.g. software) application. The barcode finder and decoder locates barcode candidate features within the acquired image of the scene 112. Note that the vision tools 142 can be employed to refine and parse the features so as to better locate barcode candidates. When barcode candidate features are resolved, a decoding process(or) within the module 144 can then be used to generate appropriate information (e.g. alphanumeric data strings) from the read barcode(s) 110.

As part of the image acquisition and barcode finding process, the camera optics O can be adjusted in order to account for the distance between the imaged surface and the sensor image plane. As it is desirable to find and decode barcodes as rapidly as possible, so as to avoid missing barcodes that may appear within the field of view for a short duration and/or in relative motion, the focus process(or) 146 herein attempts to adjust the variable lens focal distance 130 according to a predetermined procedure described below.

Optionally, one or more additional range-finding devices (e.g. a LIDAR, time-of-flight sensor, stereoscopic arrangement, ultrasound and/or radar) 170 can be used to deliver range information 172 to appropriate functional module(s) of the vision system process(or) 140. The range information 172 can define the physical distance (double-dashed arrow 174 between the camera assembly 120 (and relative to the sensor image plane) and the surface of the imaged object 112. This data 172 can be used to supplement the pixel-based focus information used herein.

Notably, the barcode finding and decoding process(or) 144 can be based upon a commercially available or customized fast barcode/symbol detector, such as Hotbars™ barcode finder available from Cognex Corporation of Natick, MA. Such a detector is capable of rapidly locating barcode-feature-containing locations/regions in an image, despite significant blur, and ordering them according to a likelihood of being real barcodes.

In addition to the rapid line-finding capabilities of the above-described Hotbars™ barcode finder, some other techniques that can be employed in combination with appropriate processor arrangements described herein to more-rapidly locate and decode (e.g. 2D barcode) barcode features include:

1. Using edge detection and Hough transformation-based line finding techniques combined with clustering to find parallel lines in a code candidate. See, by way of background, Peter Bodnar and Laszlo G. Nyul, *Improving Barcode Detection with Combination of Simple Detectors*, Eighth International Conference on Signal Image Technology and Internet Based Systems (2012); and Peter Bodnar, *Image Analysis Methods for Localization of Visual Codes*, Ph.D. thesis, PhD School in Computer Science Department of Image Processing and Computer Graphics Faculty of Science and Informatics University of Szeged, Hungary (2015), available on the World Wide Web at URL address, http://doktori.bibl.u-szeged.hu/2825/8/tezisfuzet.pdf;

2. Using a histogram of gaussian (HoG) features in tiles of the acquired image containing the candidate barcode to detect neighboring tiles having a similar dominant orientation. See, by way of background, Peter Bodnar, *Image Analysis Methods for Localization of Visual Codes* (cited above);

3. Using adaptive image thresholding to binarize the bars and spaces in the imaged barcode, and image morphology to merge into barcode regions. See, by way of background, Daw-Tung Lin, Chin-Lin Lin, Automatic Location for Multi-Symbology and Multiple 1D and 2D Barcodes, Journal of Marine Science and Technology, Vol. 21, No. 6, pp. 663-668 (2013); Savreet Kaur and Raman Maini, *Implementation of Barcode Localization Technique using Morphological Operations*, International Journal of Computer Applications (0975-8887), Volume 97, No. 13, July 2014; and Peter Bodnar, Image Analysis Methods for Localization of Visual Codes (cited above); and 4. Using deep learning to perform texture classification. See, by way of background, Hansen, Daniel Kold; Nasrollahi, Kamal; Rasmussen, Christoffer Bøgelund; Moeslund, Thomas B., *Real-Time Barcode Detection and Classification Using Deep Learning*, Published in the Proceedings of the 9th International Joint Conference on Computational Intelligence-Volume 1: IJCCI (2017); and Peter Bodnar, Image Analysis Methods for Localization of Visual Codes (cited above).

Further techniques for more-rapidly finding and decoding selected types of barcodes under certain conditions are described, by way of example, in Yunhua Gu, Weixiang Zhang, *QR Code Recognition Based On Image Processing*, International Conference on Information Science and Technology, IEEE, published May 10, 2011.

II. Generalized Auto-Focus Operating Procedure

Figure 2:
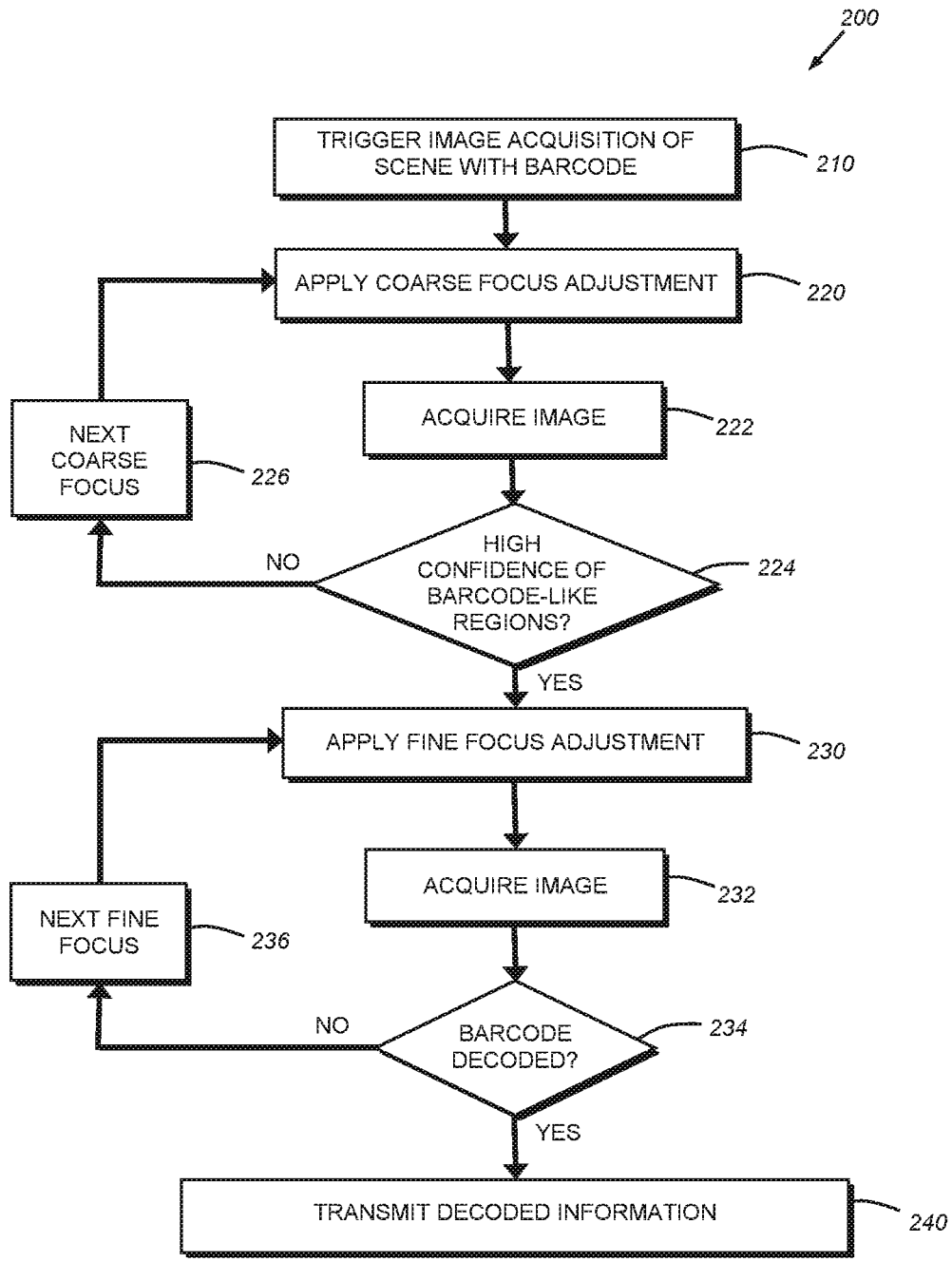
FIG. 2 is a flow diagram showing a generalized procedure for applying coarse focus and fine focus concurrently with barcode finding and decoding according to an embodiment.

FIG. 2 shows a generalized procedure for carrying out an auto-focus procedure 200 according to an embodiment. The user, or anther process, triggers image acquisition in the presence of a barcode (or more generally the presence of a "barcode-like region", which term shall be sued interchangeable with "barcode", as appropriate) in a scene 210. The procedure 200 then applies a coarse focus adjustment in step 220. This adjustment entails signaling the lens to attain a predetermined focal distance (typically expressed as a focus/diopter value). At least one image is then acquired by the sensor at this selected focal distance in step 222. The system then searches for barcode candidate features using appropriate vision system tools, and if no barcode features are found and/or do not meet a predetermined confidence score/likelihood, (decision step 224), then the next coarse focus value (focus plane, described below) is selected (step 226) and the adjustment is applied in step 220. Another image is acquired and the barcode location/determination process (decision step 224) is repeated until a barcode is found (or the coarse focus values have been exhausted). If there is a high confidence and/or likelihood of existence (confidence value/score above a predetermined threshold) that a barcode resides in a region of interest (via decision step 224), the procedure 200 then applies a fine focus adjustment procedure to the lens in step 230. In an embodiment, described further below, an initial set of nominal focus planes can be determined and the coarse focus process scans through such planes until a barcode for a region is identified with sufficient confidence/likelihood. Additionally, the procedure can prioritize regions to search based upon likelihood of barcodes or other metrics—for example user-defined metrics on likely barcode-containing regions within the acquired image and regions are scanned for coarse focus based upon such priorities, moving between focus planes until either all are exhausted or a barcode of sufficient confidence are found.

Figure 2A:
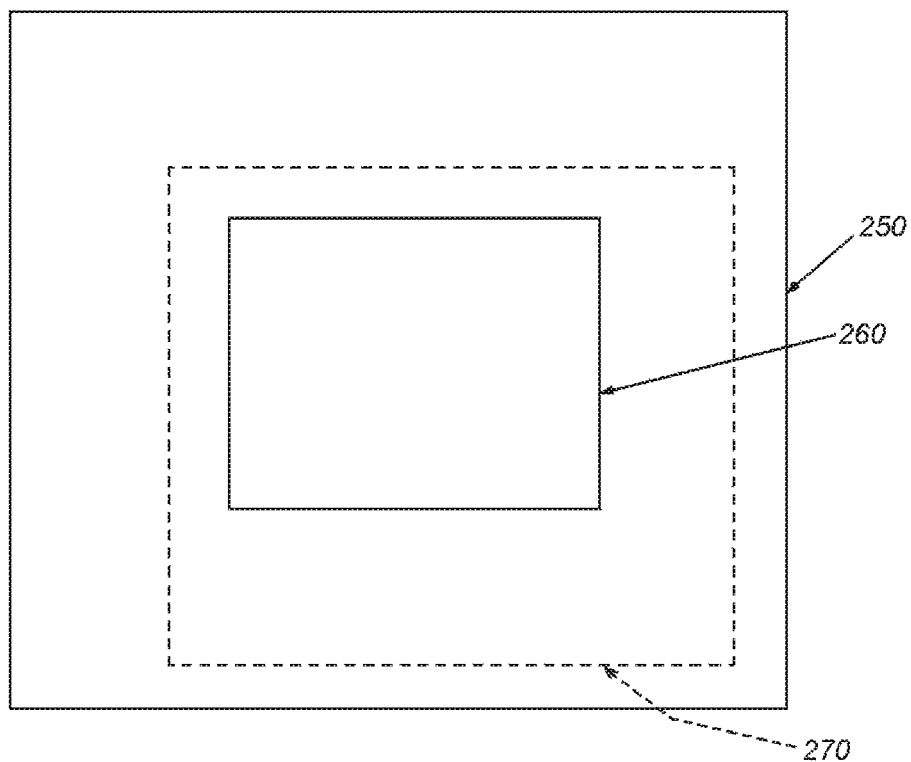
FIG. 2A is a diagram showing a field of view of the camera assembly of FIG. 1 and a central target region and user-defined region of interest for use in locating barcode-like regions.

An image is acquired at this fine adjustment value in step 232. The barcode finding and decoding procedure then determines whether the located barcode(s) from the coarse focus steps is decoded to provide appropriate information (decision step 234). If not, a new fine focus value is selected in step 236 and applied to the lens (step 230), and then the acquisition and determination steps 232 and 234 are repeated until a barcode is decoded or all fine values are exhausted. The decoded barcode results/information (if any) are then transmitted to an appropriate downstream process in step 240 (via decision step 234). Referring to the exemplary field of view 250 in FIG. 2A, if no region is found to contain a decodable barcode/barcode-like region (fragment) during the coarse focus process, then the center quarter (approximately bounded box 250) of the field of view 250, or an entire user-selected region of interest (exemplary dashed box 270) can be used as the target region for subsequent barcode search. This process then converts to a traditional contrast/sharpness-based search algorithm/procedure to locate barcode(s) within the new region 260 or 270.

Figure 4:
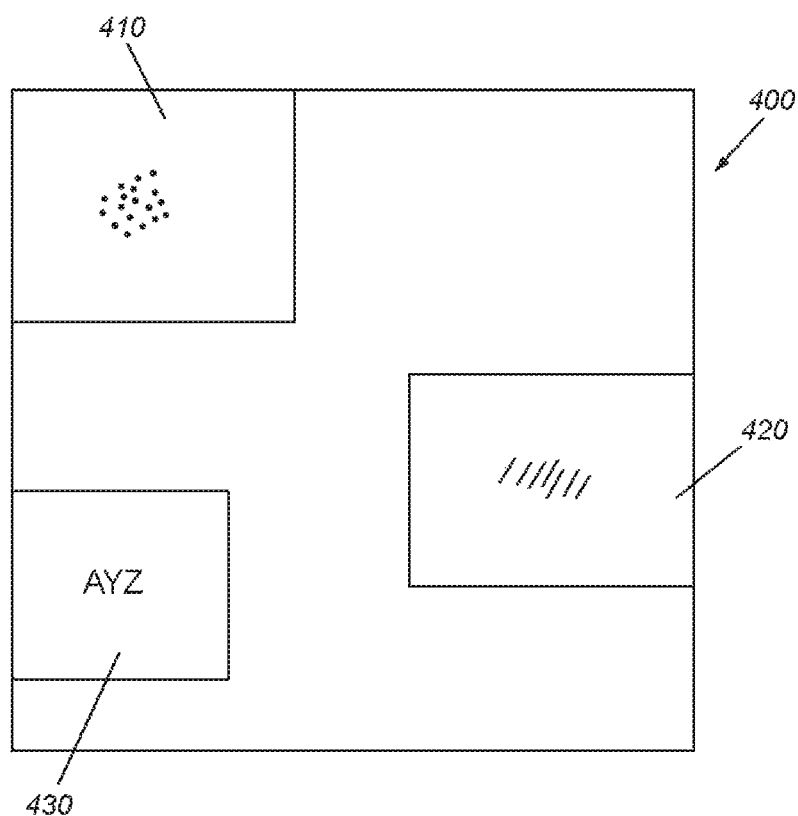
FIG. 4 is an exemplary acquired image of a scene containing an object with barcode thereon, showing various regions of interest upon which the procedures of FIGS. 2 and 3 operate.

Note that, as described generally above, and in further detail below, in any acquired image of the scene there may exist several regions of interest containing features that may require decoding. By way of example, FIG. 4 shows an acquired image scene 400 of an underlying object in which at least three regions of interest 410, 420 and 430 are depicted containing, respectively, a 2D barcode, a 1D barcode and text. The text may be omitted from further processing once it is verified that no barcode features are present. The boundaries of each region can vary and can be set by default or scaled to include the barcode-like regions (barcodes and/or fragments thereof) located therein.

Advantageously, in operation a small number of acquired images at various coarse diopter settings throughout the possible focus range of the imaging system (called nominal focus planes), are employed for the barcode detector to detect all barcode-like regions in the scene, regardless of distance, by defining a relatively large depth-of-field for the reader optics. Such high depth of field optics are described, by way of useful background information in U.S. patent application Ser. No. 15/844,448, entitled, DUAL-IMAGING VISION SYSTEM CAMERA AND METHOD FOR USING THE SAME, filed Dec. 15, 2017. The process of acquiring images at these nominal focus planes is especially efficient when using a high-speed variable lens arrangement that can act upon changes in diopter value rapidly—such as a liquid lens.

As described below, the procedure 200 can also employ an optional distance measurement (e.g. range data 172) from available sensors (e.g. time-of-flight and/or other range-finding device 170) to constrain the coarse focus range so that the initial value and incremental change in value occurs in and around a sensed range.

In embodiments, the use of a fine focus step is employed to refine the coarse focus diopter value setting for each barcode-like region. An image is acquired at this setting and then decoding of the barcode is attempted using the decoding process. Barcode-like regions are processed in order of the greatest current likelihood of the presence of barcode features. This arrangement is essentially an intelligent mechanism for visual attention (for both location within the field of view, as well as distance within the focal range, of the imaging system/camera assembly).

III. Auto-Focus Process

Figure 3:
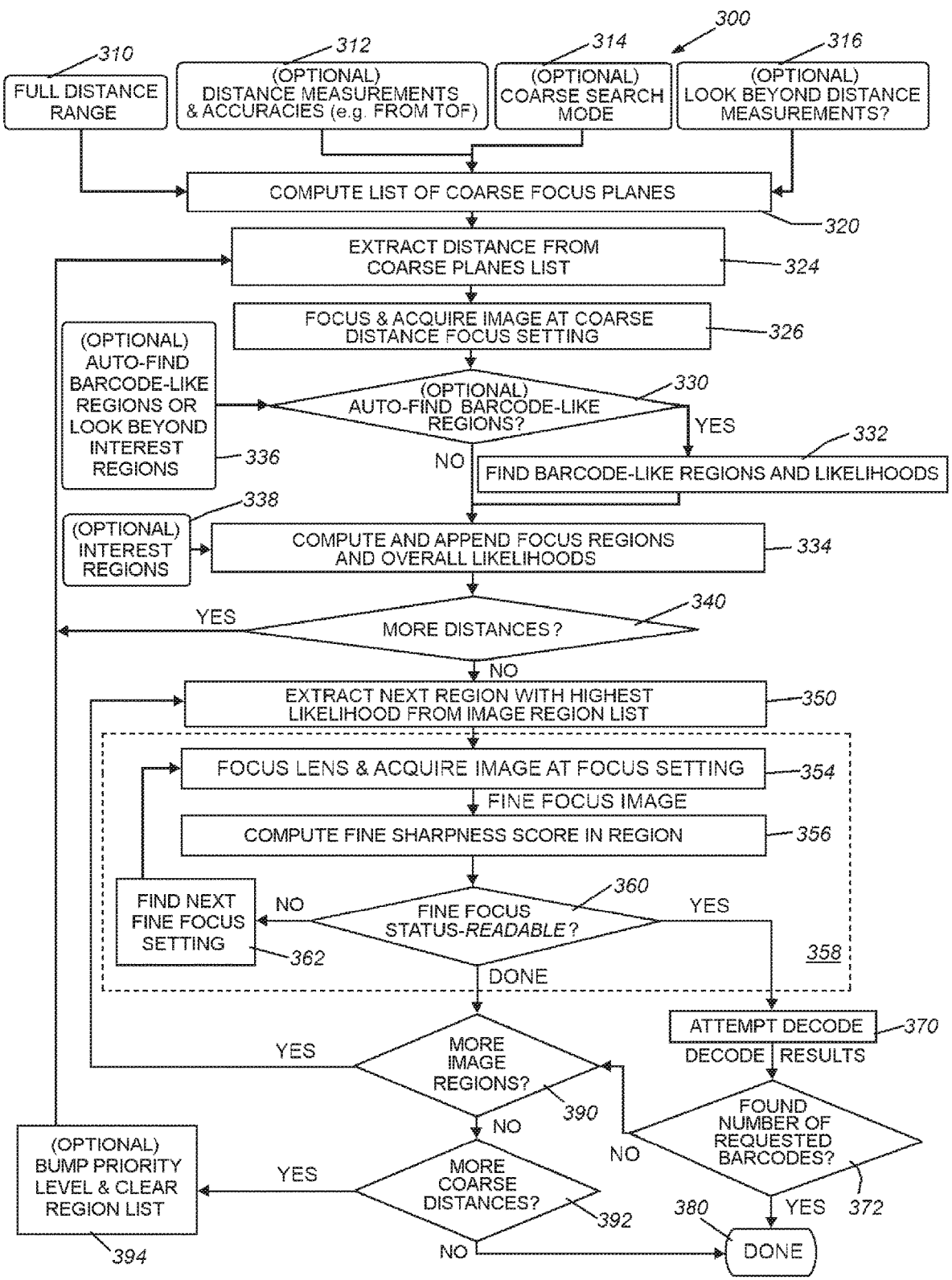
FIG. 3 is a more detailed procedure for the auto-focus process according to an illustrative embodiment.

A more detailed flow diagram of an auto-focus procedure 300 is shown in FIG. 3. The procedure 300 receives inputs, including the full distance range 310 if the camera/imaging system, optional distance measurements 312 from a range-finding sensor, the coarse search mode—i.e. the technique(s) to be used in searching for barcode-like regions 314, and whether the coarse search will look beyond (closer and/or further) a given distance defined by the optional distance measurements, and (optionally) whether to examine any distances (closer to and/or further from the image sensor) other than the available distance measurements 316. Note that input elements 312, 314 and 316 can be optional in the overall procedure 300 and are denoted as such (i.e. "OPTIONAL") in FIG. 3. Other optional procedure steps/inputs likewise marked, as described below. Such optional inputs, steps and processes can be omitted in the overall procedure and/or selected by users at setup or runtime. More particularly, the coarse search mode input 314 determines the priorities of the different coarse plane distances as described further below. In general, the use of priorities in processing coarse planes is optional, as described further below. The look beyond distance measurements input 316 can decide to treat the distance measurements (if any) as accurate and not look for barcodes elsewhere. Alternatively, the input 316 can decide to treat the distance measurements (if any) as hints, and potentially look for barcodes in these locations first, but then, if the process has not successfully decoded the required barcodes, look for barcodes at other distances within the range.

The information of elements 310-316 is/can be used to compute a list of coarse focus planes to be used in the coarse focus procedure (step 320). After computing coarse focus planes, step 324 then extracts a distance from the coarse plane list. This starts with an initial plane value that can be a default (e.g. a median distance within the range of planes and/or the distance measured by the range finder (step 324)). Alternatively, the distance measurement can be based-upon (or include) a predefined distance distribution according to an appropriate heuristic that operates within the specified working distance of the sensor. Note that this part of the procedure 300 can be arranged in priority levels, with step 324 extracting a distance having the current priority level. Where no priority levels provided, then only a single set of focus planes is used. The camera optics is then focused to the current (priority level) focus plane's associated diopter value and at least one image is acquired in step 326. The procedure uses the acquired image(s) to determine (decision step 330) whether and where any barcodes, and/or the likelihood that such barcodes, are present in the image (step 332). If so, then these barcodes/likelihoods, in addition to their respective region(s) and corresponding focal distance value(s) are stored (appended to the list of regions). Note that the determination of barcodes can be based upon an auto-finding function or can occur outside regions of interest in the overall image (input 336). Then, in step 334 focus region(s) are computed and appended along with the overall likelihoods for interest regions (input 338). Note that the input and designation of interest regions 338 and 334 are optional in the overall procedure 300. Such optional interest regions can be employed where there is preexisting knowledge of a possible or approximate location of the barcode(s) in the image—for example, based upon their location in the previous acquired image(s). Note, additionally that the auto-find input 336 and process steps 330, 332 are optional. The optional auto-find process 330, 332 and 338 can be used if the procedure is able to treat the regions of interest (if any) as accurate, and thus, not look for barcodes in any other locations outside these regions. If auto-find is not used (decision step 330) then the regions of interest (if any) can be treated only as hints, and the procedure 300 can initially look in those regions for barcodes, but then, if required barcodes are not decoded, the procedure 300 searches for barcode-like regions within the regions of interest across (e.g.) the entire acquired image.

The procedure 300 then queries whether all plane distances have been operated upon (decision step 340). Optionally, this query can be limited to the current priority level if multiple priority levels are provided in the procedure 300. If more plane distance are to be operated upon in the coarse focus process (optionally, within the current priority level, if provided), then the procedure 300 returns to step 324 and extracts the next incremental distance. The coarse finding process (steps 324, 326, 330, 332 and 334) then repeats via decision step 340. Conversely, if the distances (optionally at the current priority level) have been exhausted, then decision step 340 branches to step 350, in which the region of the overall coarse image with the highest likelihood is extracted (and removed) from the previously stored list of image regions. The camera lens is then focused to the best coarse focus for that region, and one or more image(s) is/are acquired in step 354. At this stage, the fine focus process (dashed box 358) is operated, with the fine sharpness score computed in step 356. In the computation, sharpness measures can include (a) a gradient measure, (b) a frequency domain measure, (c) an auto-correlation measure, (d) a variance measure, (e) a statistical measure, and/or (d) an edge-based measure. By way of background, see Yi Yao, Besma Abidi, Narjes Doggaz, and Mongi Abidi, *Evaluation of Sharpness Measures and Search Algorithms for the Auto-Focusing of High Magnification Images*, Proceedings of SPIE—The International Society for Optical Engineering 6246, June 2006. If the focus generates a sharpness score that may not be sufficient (below a predetermined threshold value) to result in a readable barcode (decision step 360), then the next fine focus setting is incremented (step 362), and the lens is refocused, with one or more new image(s) acquired (step 354), and then a new sharpness score is computed (step 360).

When a sufficient sharpness score is generated (decision step 360), then and attempt is made to decode the barcode features within the region by an associated decoding process (step 370) Note that, in addition to using regions of interest, the coarse and/or fine focus process (barcode search) can be performed upon full-size acquired images or subsampled images. If subsampled images are used for the focus process, then a full-size image should be captured at desired focus plane for decoding. If the given number of required (requested) barcode(s) is/are properly found/decoded, and the results are provided to the system (and no other barcodes are present in the image to decode), then the focus and decoding process is complete (step 380 via decision step 372). Otherwise, the procedure branches to decision step 390 to determine if more stored regions remain. If so, then the fine focus process 358 is repeated after extracting the next region with highest likelihood (step 350). If all regions have been processed, then decision step branches to decision step 392 to determine if any more coarse distances are present. If not, the procedure 300 completes (step 380). If another coarse distance is present (for example, an imaged object in which a plurality of barcodes at different distances must be read, but not all the distances have yet been processed, then the procedure 300 branches to step 394, in which the priority level (if employed) is incremented and the original region list is cleared. This process can include, for example, reading coarse focus planes with lower priority levels, such as focus planes that are outside the specified range established around an input distance measurement from a range sensor (and/or other heuristic) out of distance measurement from rangers. In the procedure 300, the distance is again extracted at the current priority level in step 324 and both the coarse and fine focus process repeat as described above, until all coarse distances have been processed.

Note that the provision of optional priority levels in accordance with steps 324, 340 and 394 is optional, whereby the procedure 300 can establish a priority ordering of the coarse planes/distances, which determines how rapidly certain types of codes can be located, focused, and decoded. In a basic implementation, no priority is provided. In this scenario, step 324 is selects the next coarse plane, decision step 340 simply queries if there are any more coarse planes/distances to be processed and step 394 can be omitted, with the procedure branch from decision step 392 returning directly to step 324. Priority levels can be employed whereby each distance is assigned a priority level (based on the coarse search mode and/or distance distribution that is provided by the system/user, as described above). Regions in a given distance/plane will only be processed after the regions for the distances/planes with higher priority levels have first been processed.

As part of the decoding process, the procedure 300 can employ one or more fine search algorithms. By way of non-limiting example, such can include (a) a fixed step size search, (b) a fixed step size search in interpolation, (c) an iterative search, (d) a variant step size search, and (e) another acceptable, iterative and/or numerical-step-based search technique. By way of background, see E. P. Krotkov, *Active Computer Vision by Cooperative Focus and Stereo*, New York, Springer-Verlag (1989).

IV. Conclusion

It should be clear that the above-described system and method effectively detects and allows decoding of barcodes of a variety of sizes and/or types within the wide range working distances often encountered using a handheld barcode reader. The system and method effectively leverages the advantageous performance of high-speed variable (e.g. liquid) lenses and newer techniques processors, such as the Hotbars™ barcode-finding algorithm and similar approached/software. This system and method thus provides advances and advantages over prior techniques for locating barcodes that were typically too slow to employ in a focusing loop. The additional instantiation of the illustrative system and method using (e.g.) FPGA hardware (which carries out the program instructions herein using hardware/firmware), can further enhance and accelerate operation of barcode detection within the imaging device's focus loop.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, it is noted that images need be acquired at all coarse focus settings prior to attempting to decode. That is, in various exemplary embodiments, it is contemplated that images can be acquired for a subset (one or more) coarse focus settings, and that subset can be processed until one or more barcodes is located and decoded. Also, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various subprocesses or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A non-transitory computer readable medium of program instructions operating on a vision system processor of an imaging system that acquires images of barcodes in a scene, performing the following steps:

acquiring coarse focus images for each of a plurality of coarse focus settings, the coarse focus settings corresponding to a range of allowable distances between the barcodes and the imaging system;

determining, via a barcode detector, barcode-like regions within the coarse focus images and estimate a respective likelihood that each of the barcode-like regions are indicative of actual barcodes, the barcode detector operating reliably in the presence of focus blur; and for each of the barcode-like regions having a threshold likelihood, using a fine focus procedure to maximize a sharpness measurement around the respective barcode-like regions by acquiring images at adjusted focus settings that are near the coarse focus setting used to acquire the coarse focus image, wherein maximizing the sharpness measurement via the fine focus procedure improves the focus to acquire an image that is sharp enough to successfully decode the barcodes at the respective barcode-like regions.

2. The computer-readable medium as set forth in claim 1, wherein the step of using the fine focus procedure occurs for each of the barcode-like regions in order of highest to lowest likelihood.

3. The computer-readable medium as set forth in claim 1, further comprising, receiving at the vision system processor, the acquired coarse focus images and operating, with the vision system processor, the barcode detector.

4. The computer-readable medium as set forth in claim 3, wherein receiving at the vision system processor comprises receiving at a processor that includes at least one of a GPU or an FPGA.

5. The computer-readable medium as set forth in claim 1, further configured to communicate with an electronically controlled variable focus lens assembly that produces selected focal lengths for the coarse focus images.

6. The computer-readable medium as set forth in claim 5, further comprising, controlling a high speed liquid lens in which the focal length thereof can be set based upon a diopter value.

7. The computer-readable medium as set forth in claim 5, further comprising, adjusting the variable focus lens assembly based upon an iterative, numerical-step-based search technique over the coarse focus settings.

8. The computer-readable medium as set forth in claim 1, wherein the steps of acquiring, determining, and using are performed according to a plurality of priority levels.

9. The computer-readable medium as set forth in claim 1, further comprising, measuring an effective depth of field based upon an effective depth-of-field of barcode detection for which the maximum focus error of the barcodes can be reliably detected.

10. The computer-readable medium as set forth in claim 1, wherein the barcode comprises at least one of a 1D barcode or a 2D barcode.

11. The computer-readable medium as set forth in claim 1, wherein the coarse focus settings are based upon a distance measurement generated by a distance sensor relative to the imaging system.

12. The computer-readable medium as set forth in claim 11, wherein the distance measurement is generated by at least one of a time-of-flight-sensor, a LIDAR, a radar, an ultrasonic sensor, a stereoscopic sensor, or a sonar sensor.

13. A vision system for detecting and acquiring images of a scene containing barcodes within a field of view of an imaging device having an image sensor and a processor comprising:

a variable lens that receives focus adjustment information and directs received light to the image sensor;

coarse focus settings of the variable lens that allow sampling a lens adjustment range, in sampling steps, over a range of distances between the barcodes and the image sensor, wherein the image sensor is arranged to acquire a coarse focus image for a coarse focus setting of the variable lens;

a barcode detector that detects barcode-like regions within the coarse focus image; and a fine focus process that, for at least one of the barcode-like regions within the coarse focus image, fine-adjusts the variable lens from the coarse focus setting to enhance the focus of the image near a location of the barcode-like regions, and acquires an image for decoding using a fine-adjusted focus setting of the variable lens.

14. The vison system as set forth in claim 13, further comprising a measurement process that measures an effective depth-of-field of barcode detection as the maximum focus error for which the barcodes can be reliably detected, and wherein a step size of the sampling steps is less than a fraction of the effective depth-of-field of barcode detection.

15. The vision system as set forth in claim 13, wherein the barcode detector is arranged to measure a respective likelihood of the barcode-like regions, and wherein the at least one of the barcode-like regions defines a likelihood above a predetermined level.

16. The vision system as set forth in claim 13, wherein the barcode detector operates at a substantially maximum frame rate of reliably locating the barcode-like regions within an image acquired by the image sensor.

17. The vision system as set forth in claim 13, wherein at least one of, (a) the variable lens comprises a high-speed liquid lens, or (b) the depth-of-field is measured in diopters and the focus adjustment information defines diopters.

18. The vision system as set forth in claim 13, wherein the fine focus process is arranged to enhance the focus of the image by acquiring an image at an adjusted focus setting, and selecting the adjusted focus setting that maximizes an image sharpness score in a local region around the barcode-like regions.

19. The vision system as set forth in claim 13 wherein, (a) the processor includes at least one of a GPU or an FPGA, and (b) distances between the barcodes and the image sensor is measured by at least one of a time-of-flight-sensor, a LIDAR, a radar, an ultrasonic sensor, a stereoscopic sensor, or a sonar sensor.

20. The vision system as set forth in claim 13, wherein the barcodes comprise at least one of a 1D barcode or a 2D barcode.

* * * * *